United States Patent
Hu et al.

(10) Patent No.: US 7,825,602 B2
(45) Date of Patent: Nov. 2, 2010

(54) OUTDOOR LIGHTING SYSTEM WITH CONTROLLED LUMINANCE

(75) Inventors: Sheng-Kai Hu, Miao-Li Hsien (TW); Wen-Jang Jiang, Miao-Li Hsien (TW)

(73) Assignee: Foxisemicon Integrated Technology, Inc., Chu-Nan, Miao-Li Hsien (TW)

( * ) Notice: Subject to any disclaimer, the term of this patent is extended or adjusted under 35 U.S.C. 154(b) by 349 days.

(21) Appl. No.: 11/940,919

(22) Filed: Nov. 15, 2007

(65) Prior Publication Data
US 2009/0002982 A1 Jan. 1, 2009

(30) Foreign Application Priority Data
Jun. 29, 2007 (CN) .......................... 2007 1 0200971

(51) Int. Cl.
*H05B 37/02* (2006.01)
(52) U.S. Cl. .......................... 315/152; 315/308; 315/312
(58) Field of Classification Search .................. 315/149, 315/152, 155–157, 291, 307, 312, 324, 308; 362/85, 145, 276, 559, 576
See application file for complete search history.

(56) References Cited

U.S. PATENT DOCUMENTS

| | | | | |
|---|---|---|---|---|
| 5,161,874 A | * | 11/1992 | Benes | ........................ 362/552 |
| 6,204,615 B1 | * | 3/2001 | Levy | ............................ 315/312 |
| 6,608,453 B2 | * | 8/2003 | Morgan et al. | ................. 315/312 |
| 7,122,976 B1 | * | 10/2006 | Null et al. | .................... 315/362 |
| 7,550,931 B2 | * | 6/2009 | Lys et al. | ..................... 315/291 |
| 2004/0000629 A1 | * | 1/2004 | Lin | ............................ 250/205 |
| 2008/0224849 A1 | * | 9/2008 | Sirhan | ........................ 340/521 |

FOREIGN PATENT DOCUMENTS

| | | |
|---|---|---|
| CN | 2357352Y Y | 1/2000 |
| CN | 2754310Y Y | 1/2006 |
| CN | 1798469A A | 7/2006 |
| JP | 2006-278061A A | 10/2006 |
| TW | I244782 | 12/2005 |

* cited by examiner

*Primary Examiner*—Thuy Vinh Tran
(74) *Attorney, Agent, or Firm*—Jeffrey T. Knapp

(57) ABSTRACT

An outdoor lighting system comprises an outdoor light source, a luminance control device, a detection apparatus, a communication network and a main controlling system. The detection apparatus is configured for detecting a luminance of the light source and generating a corresponding detecting signal associated with the luminance of the light source. The main controlling system receives the detecting signal from the detection apparatus via the communication network, and generates a luminance control signal in responsive to the detecting signal; the luminance control device is configured for receiving the luminance control signal via the communication network and regulating the luminance of the light source according to the luminance control signal.

8 Claims, 3 Drawing Sheets

OUTDOOR LIGHTING SYSTEM WITH CONTROLLED LUMINANCE

BACKGROUND OF THE INVENTION

1. Field of the Invention

The present invention generally relates to a lighting system and, particularly to an outdoor lighting system.

2. Description of Related Art

Electric outdoor lamps such as street lamps are of a general high priority due to road safety and security purpose. Previously, street lamps controllers have historically only turned the street lamps on or off with a given preset light level or off after a delayed time usually 4 hours after dark.

Furthermore, when the outdoor lamps are on, the luminance value of an outdoor lamp may became higher or lower than a luminance value for actual need. If the luminance value is too low, the road safety will be influenced, and if too high, it will waste energy sources, and the working life of the outdoor lamps will decrease.

Therefore, there is a need for an outdoor lighting system with controlled luminance.

SUMMARY OF THE INVENTION

An outdoor lighting system comprises an outdoor light source, a luminance control device, a detection apparatus, a communication network and a main controlling system. The detection apparatus is configured for detecting a luminance of the light source and generating a corresponding detecting signal associated with the luminance of the light source. The main controlling system receives the detecting signal from the detection apparatus via the communication network, and generates a luminance control signal in responsive to the detecting signal; the luminance control device is configured for receiving the luminance control signal via the communication network and regulating the luminance of the light source according to the luminance control signal.

Other systems, methods, and advantages of the present outdoor lighting system will be or become apparent to one with skill in the art upon examination of the following drawings and detailed description. It is intended that all such additional systems, methods, features, and advantages be included within this description, be within the scope of the present outdoor lighting system, and be protected by the accompanying claims.

BRIEF DESCRIPTION OF THE DRAWINGS

Many aspects of the present outdoor lighting system can be better understood with reference to the following drawings. The components in the drawings are not necessarily drawn to scale, emphasis instead being placed upon clearly illustrating the principles of the present outdoor lighting system. Moreover, in the drawings, like reference numerals designate corresponding parts throughout the several views.

DETAILED DESCRIPTION OF THE INVENTION

Figure 1:
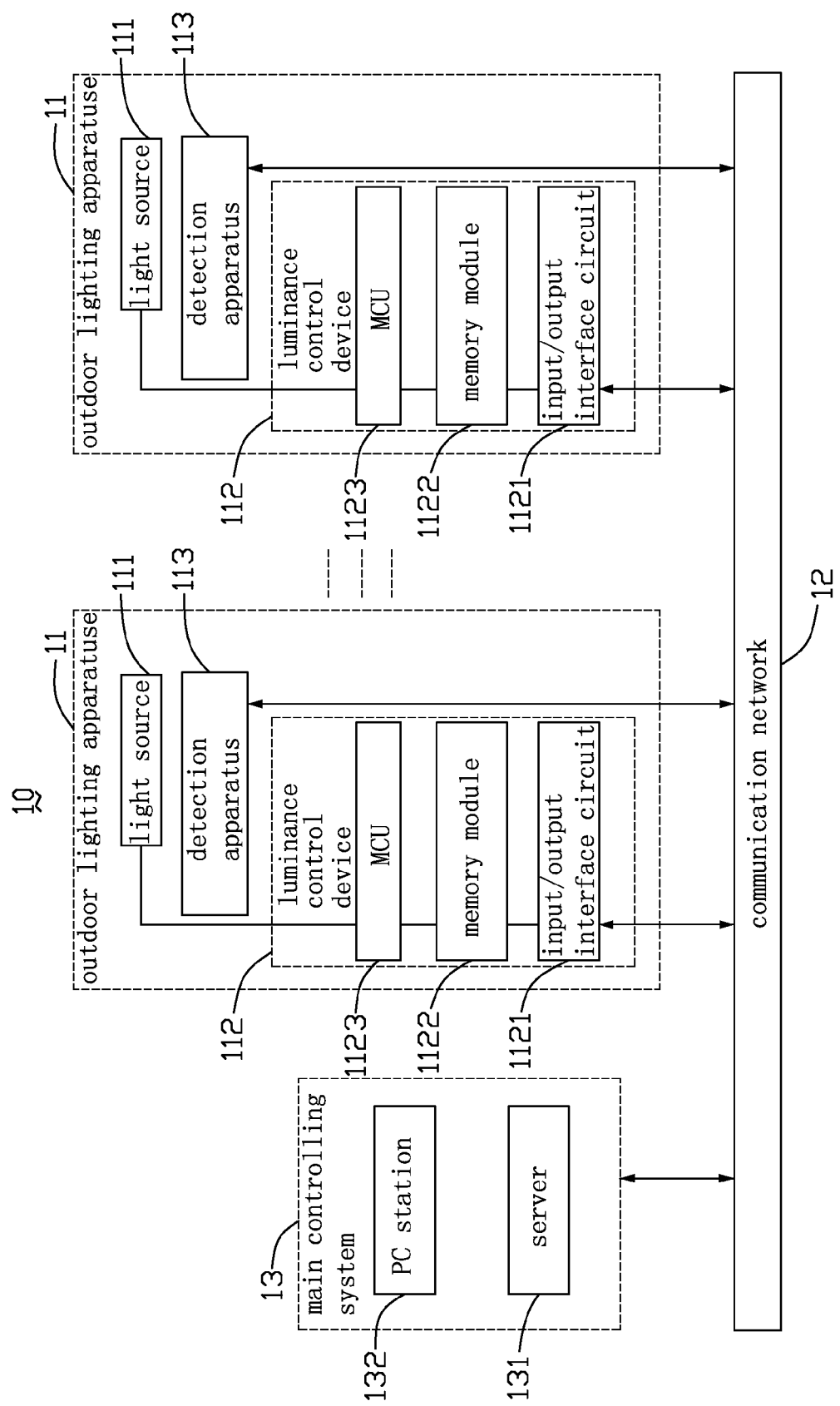
FIG. 1 is a block diagram showing a basic structure of an outdoor lighting system with controlled luminance, in accordance with a first embodiment.

Referring to FIG. 1, an outdoor lighting system 10 with controlled luminance, in accordance with a first embodiment, is provided. The outdoor lighting system 10 comprises a plurality of outdoor lighting apparatuses 11, a communication network 12 and a main controlling system 13.

Figure 2:
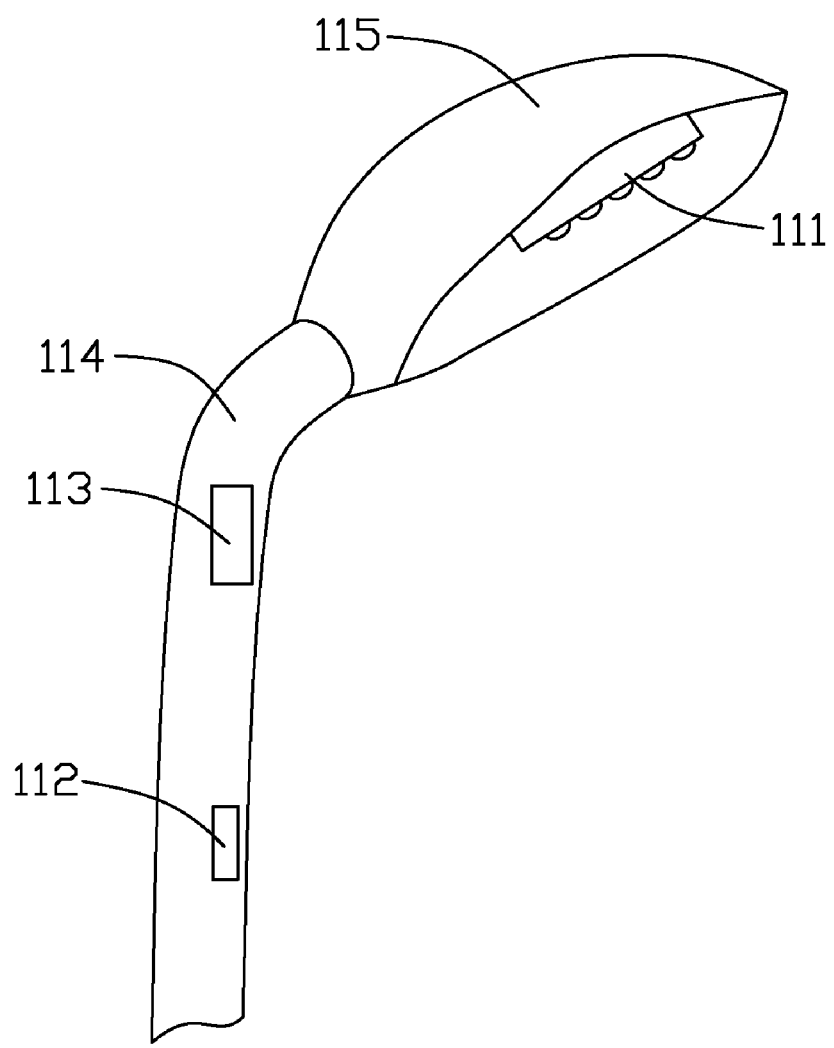
FIG. 2 is a schematic diagram showing a detailed structure of an outdoor lighting apparatus of the outdoor lighting system of FIG. 1.

Referring also to FIG. 2, each of the outdoor lighting apparatus 11 comprises an outdoor light source 111, a luminance control device 112 electrically connected to the light source 111, and a detection apparatus 113. In this embodiment, each of the outdoor lighting apparatuses 11 further comprises a lamp pole 114 and a lamp housing 115 mounted on the lamp pole 114. The light source 111 is received in the lamp housing 115. The luminance control device 112 and the detection apparatus 113 both are mounted on the lamp pole 114. The detection apparatus 113 is disposed adjacent to the light source 111. Alternatively, the luminance control device 112 and the detecting apparatus 113 both may be mounted in the lamp housing 115.

The light source 111 may be a high pressure sodium lamp, a metal halide lamp, or an LED (Light Emitting Diode) lamp.

The luminance control device 112 comprises an input/output interface circuit 1121, a memory module 1122 and a MCU (Micro-programmed Control Unit) 1123. The luminance control device 112 is electrically connected to the communication network 12 via the input/output interface circuit 1121 for communicating with the main controlling system 13. The luminance control device 112 is configured for increasing or decreasing a drive current flowing through the light source 111 for regulating a luminance value of the light source 111.

The detection apparatus 113 is secured adjacent to the light source 111 and electrically connected to the communication network 12. The detection apparatus 113 is configured for detecting a luminance of the light source 111 within an area of the radiation range of the light source 111 and a failed condition of each outdoor lighting apparatus 11, and then generating a corresponding detecting signal associated with the luminance signal of the light source 111. The detection apparatus 113 may be an analog camera, an IP (Internet Protocol) camera, a dome camera or a speed dome camera.

The communication network 12 may be 2.5G, 3G or other wireless data communication network, or wired network such as ADSL, VDSL, DTMF, RS485.

The main controlling system 13 is connected to the communication network 12, provided for receiving the detecting signal from the detection apparatus 113 of each outdoor lighting apparatuses 11 via the communication network 12, and for generating a luminance control signal in responsive to the detecting signal to regulate the luminance of the light source 111 of each outdoor lighting apparatus 11. The main controlling system 13 beneficially comprises a server 131 for processing and storing the detecting signals from the detection apparatus 113, and a PC station 132. The PC station 132 rather suitably is installed softwares comprising an information receive data processing software and an application management software.

When the outdoor lighting system 10 is in operation, the detection apparatus 113 detects a luminance of the light source 111 within the area of the radiation range of the light source 111, generates a corresponding electric detecting signal associated with the luminance of the light source 111 and transmits the detecting signal to the main controlling system 13. The server 131 of the main controlling system 13 then stores the detecting signal. The PC station 132 of the main controlling system 13 receives the detecting signal from the server 131 and analyzes the detecting signal via the information receive data processing software, and then generates a result. The PC station 132 analyzes the result and generates a control command via the application management software. The PC station 132 sends a luminance control signal according to the control command, for regulating the luminance of the light source 111. The luminance control signal is transmitted to the luminance control device 112 via the communication network 12, and stored in the memory module 1122 of the luminance control device 112. The MCU 1123 receives the luminance control signal stored in the memory module 1122 and adjusts the drive current flowing through the light source 111 thus to regulate the luminance of the light source 111. For example, when the luminance value of the light source 111 within the area of the radiation range of the light source 111 is overhigh, the PC station 132 sends the luminance control signal to the luminance control device 112, and the luminance control device 112 reduces the luminance of the light source 111 by reducing the drive current or turns off the light source 111 for energy saving. In addition, when the detecting apparatus 113 detects the failed condition of the outdoor lighting apparatus 11, users can identify it through a display of the PC station 132 and can quickly react to maintain the outdoor lighting apparatus 11.

Figure 3:
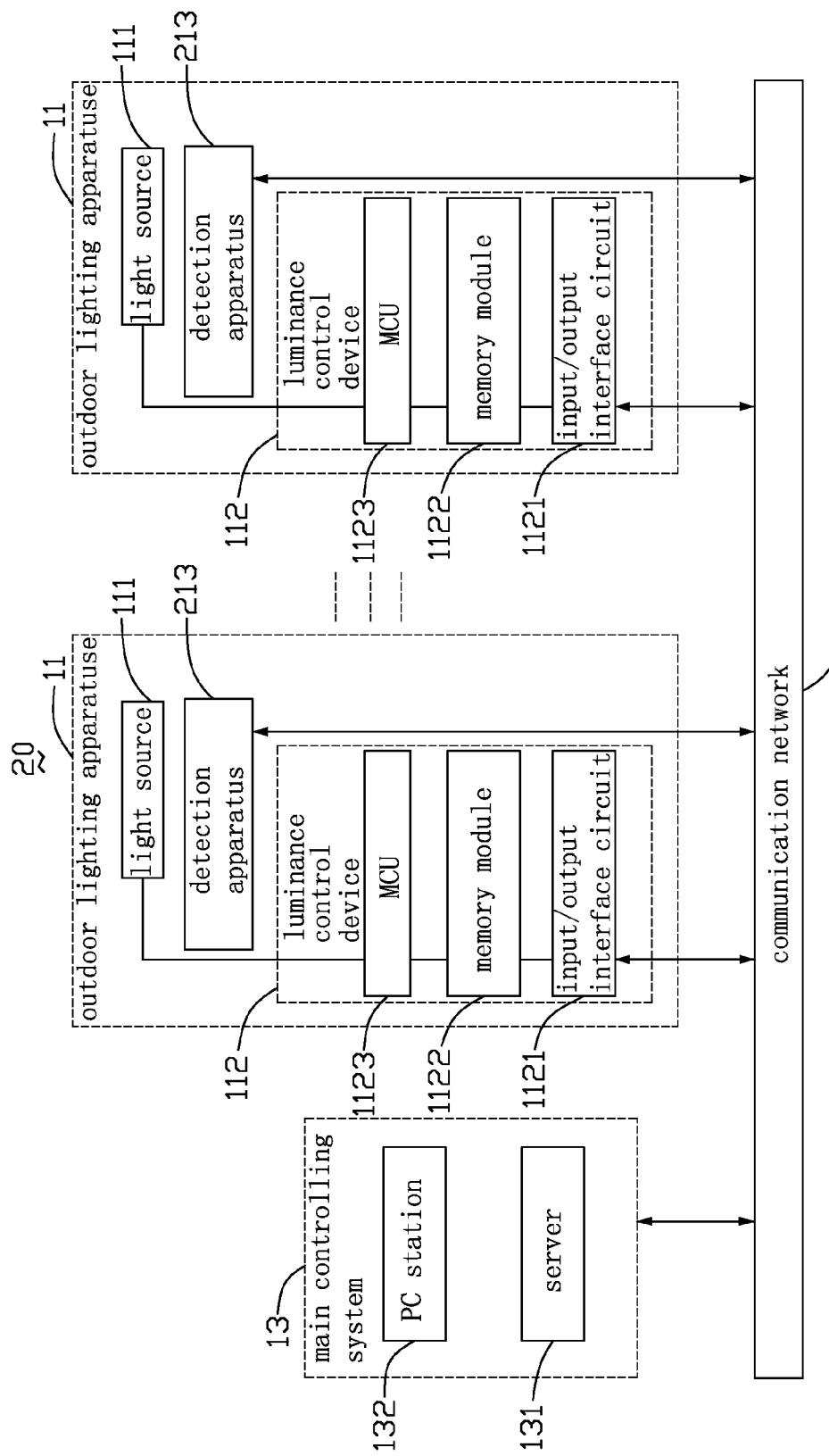
FIG. 3 is a block diagram showing a basic structure of an outdoor lighting system with controlled luminance, in accordance with a second embodiment.

Referring also to FIG. 3, an outdoor lighting system 20 with controlled luminance, in accordance with a second embodiment, is provided. The outdoor lighting system 20 is similar to the outdoor lighting system 10 in the first embodiment. The system 20 comprises a detection apparatus 213 for detecting a luminance of the light source 111 within the area of the radiation range of the light source 111. The detection apparatus 213 can be secured on a location of the lamp pole 114 or the lamp housing 115, which is in the radiation range of the light source 111. A difference between the system 10 and the system 20 is that the detection apparatus 213 of the system 20 may be a luminance detection apparatus having a photosensitive element and a converter. The photosensitive element may be a photosensitive resistor (such as a cadmium sulfide photosensitive resistor), a photosensitive diode, or a photosensitive triode.

The detection apparatus 213 is secured adjacent to the light source 111 and connected to the communication network 12. The detection apparatus 213 is configured for detecting a luminance of the light source 111 within an area of the radiation range of the light source 111, generating a corresponding electric detecting signal, and transmitting the detecting signal to the main controlling system 13.

When the system 20 is in operation, the detection apparatus 213 detects a luminance of the light source 111 within an area of the radiation range of the light source 111, generates a corresponding electric detecting signal associated with the luminance of the light source 111 and transmits it to the main controlling system 13. The server 131 of the main controlling system 13 then stores the detecting signal. The PC station 132 of the main controlling system 13 receives the detecting signal and analyzes it via the information receive data processing software, and then generates a result. The PC station 132 analyzes the result and generates a control command via the application management software. The PC station 132 generates a luminance control signal according to the control command, for adjusting the luminance of the light source 111. The luminance control signal is transmitted to the luminance control device 112 via the communication network 12, and stored in the memory module 1122 of the luminance control device 112. The MCU 1123 receives the luminance control signal stored in the memory module 1122 and adjusts the drive current flowing through the light source 111, thus to regulate the luminance of the light source 111. For example, when the luminance value of the light source 111 within the area of the radial range of the light source 111 is overhigh, the PC station 132 sends the luminance control signal to the luminance control device 112, and the luminance control device 112 reduces the luminance of the light source 111 by reducing the drive current or turns off the light source 111 for energy saving.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. An outdoor lighting system, comprising:
   an outdoor light source;
   a luminance control device;
   a detection apparatus configured for detecting a luminance of the light source and generating a corresponding detecting signal associated with the luminance of the light source;
   a communication network; and
   a main controlling system for receiving the detecting signal from the detection apparatus via the communication network, and generating a luminance control signal in responsive to the detecting signal; the luminance control device being configured for receiving the luminance control signal via the communication network and regulating the luminance of the light source according to the luminance control signal;
   wherein the detection apparatus is a luminance detection apparatus configured for detecting the luminance within an area of the radiation range of the light source;
   wherein the detection apparatus is selected from a group consisting of an analog camera, an IP camera, a dome camera and a speed dome camera.

2. The outdoor lighting system according to claim 1, wherein the light source is selected from a group consisting of a high pressure sodium lamp, a metal halide lamp, and an LED lamp.

3. The outdoor lighting system according to claim 1, further comprising a lamp pole and a lamp housing secured on the lamp pole, the light source being received in the lamp housing.

4. The outdoor lighting system according to claim 3, wherein the luminance control device is installed on the lamp pole or in the lamp housing.

5. The outdoor lighting system according to claim 3, wherein the detection apparatus is installed on the lamp pole or in the lamp housing.

6. The outdoor lighting system according to claim 1, wherein the main controlling system comprises a server and a PC station, the server is configured for storing the detecting signal about the luminance of the light source, the PC station is configured for reading a luminance signal of the detecting signal from the server and analyzing the detecting signal to generating a control command for controlling the luminance of the light source.

7. The outdoor lighting system according to claim 1, wherein the communication network is selected from a group consisting of a wireless data communication network, and a wired network.

8. An outdoor lighting system, comprising:
   an outdoor light source;

a detection apparatus configured for detecting a failed condition of the outdoor lighting source, and generating a corresponding detecting signal associated with the failed condition of the outdoor lighting source;

a communication network; and a main controlling system for receiving the detecting signal from the detection apparatus via the communication network, the main controlling system comprising a server and a PC station, the server being configured for storing the detecting signal about the failed condition of the light source, the PC station being configured for displaying the failed condition of the outdoor lighting source for identifying the outdoor light source;

wherein the detection apparatus is selected from a group consisting of an analog camera, an IP camera, a dome camera and a speed dome camera.

* * * * *